Dec. 2, 1952     M. E. BEAUCHAMP     2,620,222
SUN VISOR
Filed July 20, 1950
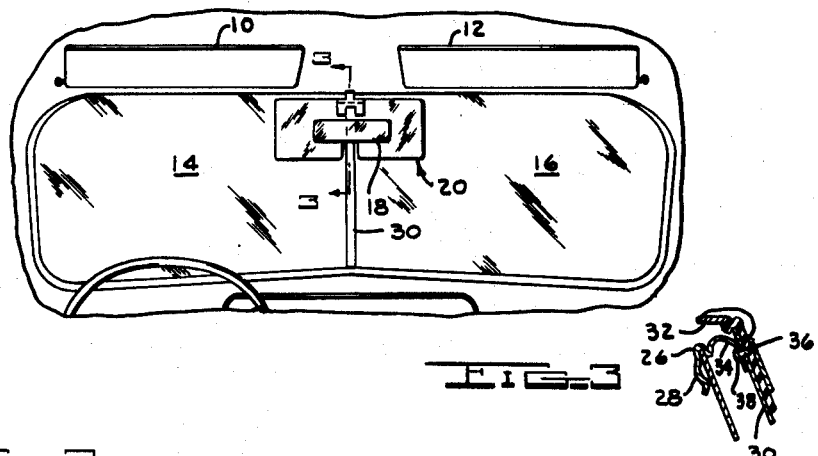
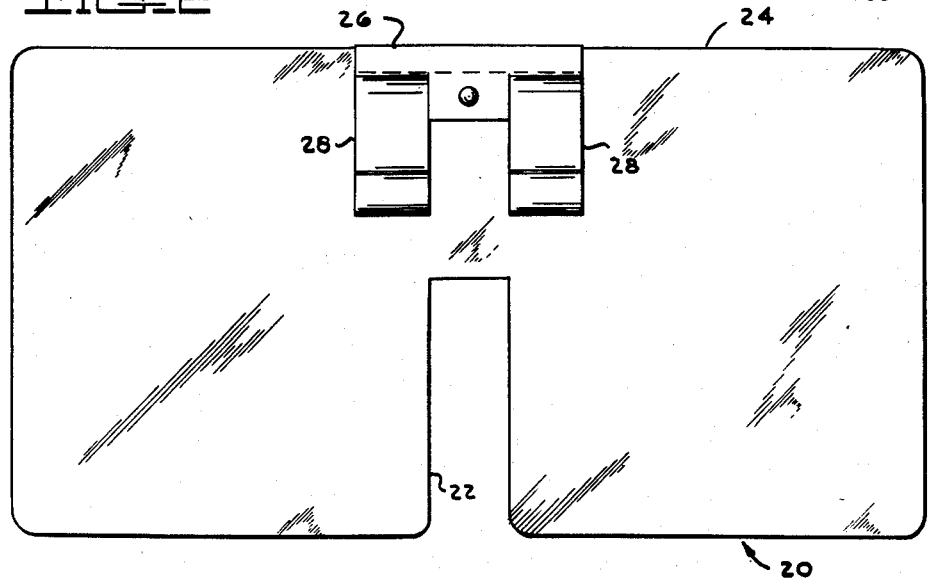
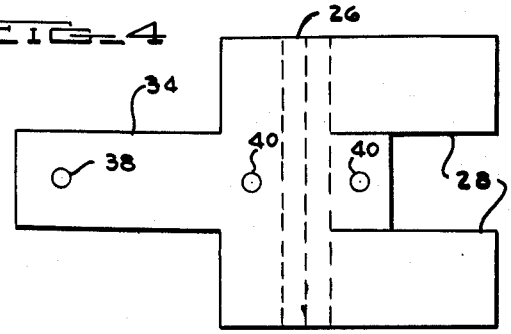
INVENTOR.
MARY E. BEAUCHAMP
BY
Arthur M. Smith
ATTORNEY Patented Dec. 2, 1952

2,620,222

UNITED STATES PATENT OFFICE 2,620,222

SUN VISOR

Mary E. Beauchamp, Wayne, Mich.

Application July 20, 1950, Serial No. 174,880

5 Claims. (Cl. 296—97)

1

The present invention relates to an auxiliary glare shield for automobiles, and more particularly to a glare shield which is adapted to be selectively mounted either between the conventional visors of a motor vehicle so that it will not interfere with the driver's use of the rear view mirror, or to be inoperatively mounted in a manner to permit ready access thereof when needed.

The automobiles of the present date generally are provided with a pair of conventional visors, one being pivotally mounted in the interior of the automobile above the windshield for use by the driver, and the other being mounted similarly for use by the passenger seated next to the driver. Since it is necessary that the rear view mirror, positioned approximately at the middle of the windshield, be clearly visible to the driver at all times, the conventional visors are not made of sufficient length to overlap, and as a result, a space is provided between the adjacent ends of the visors through which sun glare and glare from headlights of approaching motor vehicles may enter to interfere with the driver's operation of the automobile. Such glare from the sun and approaching vehicles not only may be dangerous because it imperils the vision of the driver, but it also is found to be very tiring on his eyes.

It is, therefore, a principal object of the present invention to provide an auxiliary transparent glare shield adapted to be mounted in a motor vehicle to span the space between the adjacent ends of the conventional visors while permitting the driver clear vision of the rear view mirror, thereby to reduce to a minimum unnecessary glare by ensuring optimum visibility and preventing unnecessary eye strain of the driver.

It is another object of the present invention to provide an auxiliary transparent glare shield adapted to be mounted in a motor vehicle and which is characterized by its simple mounting construction enabling it to be selectively mounted either in an operative position to span the space between the adjacent ends of conventional visors or in an inoperative position on the back of one of said conventional visors; and further to provide a transparent glare shield adapted to straddle the mounting post of the rear view mirror whereby the driver's view of said mirror will not be obstructed.

It is still another object of the present invention to provide an article of manufacture adapted to be used as an auxiliary transparent glare shield, and which article of manufacture is characterized by its extreme simplicity of construction permitting it to be produced at a relatively low cost, and which is constructed and arranged to permit it to be mounted in a motor vehicle to straddle the rear view mirror mounting post so as not to obstruct the operator's use of said mirror.

2

Other objects of this invention will appear in the following description and appended claims, reference being had to the accompanying drawings forming a part of this specification wherein like reference characters designate corresponding parts in the several views.

In the drawings:

Fig. 1 is a fragmentary elevational view of the interior of a motor vehicle showing the transparent auxiliary glare shield mounted in its operative position between the conventional visors and straddling the mounting post of the rear view mirror;

Fig. 2 is a plan view of the transparent auxiliary glare shield showing a spring clip construction for mounting the shield in an inoperative position;

Fig. 3 is a fragmentary sectional view taken on the line 3—3 of Fig. 1; and

Fig. 4 is a plan view of the sheet metal blank from which the mounting means for the shield is constructed.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and particularly to Fig. 1, a portion of the interior of a motor vehicle can be seen. Conventional visors 10 and 12 are shown pivotally mounted above the driver's seat and above the seat adjacent the driver. When these visors are moved to their operative position, they will cover the upper portions of the windshields 14 and 16. As can be seen, the rear view mirror 18 is mounted in the conventional manner between the windshields 14 and 16.

When using the conventional visors 10 and 12, it is often desired that a glare shield be provided which extends entirely across the windshields 14 and 16, but this result cannot be obtained by use of said conventional visors 10 and 12 alone, since it is necessary that the driver always have an unobstructed view of his rear view mirror 18. Accordingly, the conventional visors 10 and 12 are constructed so that they will not be able to cover any portion of the mirror 18 with the result that there is a space, unprotected against glare, between the windshields 14 and 16 adjacent the mirror 18.

In order to overcome this shortcoming, the present transparent glare shield 20 has been developed for spanning the open space between the adjacent ends of the conventional glare shields 10 and 12. As can be seen, the transparent glare shield 20 is mounted to straddle the supporting post of the mirror 18 and is of sufficient length to span the space between the adjacent ends of the conventional visors 10 and 12.

In order to permit the transparent glare shield 20 to be positioned behind the rear view mirror 18, a slot 22 is provided in the shield 20 which is of sufficient width and length to permit the mounting post of the rear view mirror 18 to be straddled. As can be seen in Fig. 2, the slot 22 is positioned substantially midway of the longitudinal axis of the transparent glare shield 20. Thus, the ends of the shield 20 will overlap respectively, the adjacent ends of the conventional visors 10 and 12.

The transparent glare shield 20 is constructed from two parts, namely, the transparent panel 24 and the mounting member 26. The transparent panel 24 can be made from any suitable Celluloid material which may be tinted so as to prevent glare and the like from passing therethrough while at the same time not obstructing the driver's vision. If it is desired to have a colorless panel 24, this can be accomplished merely by using a suitable polarized plate. It should be understood that it is contemplated to use any form of material for the plate 24 which will enable the driver to see through it while at the same time eliminating the glare from headlights, the sun, and the like.

The support member 26 can be made from any stamping of sheet metal or the like. As seen in Fig. 4, a sheet metal blank can be formed in a stamping operation which can then be shaped to be secured to the upper edge of the panel 24 in any suitable manner. This member 26 is constructed so that it can support the panel 24 in an operative position as shown in Fig. 1 and Fig. 3, or so that it can be used for attaching the transparent panel 24 in an inoperative position on the backside of either of the conventional visors 10 or 12.

The means for attaching the panel 24 to the back of one of the conventional visors 10 or 12 can be seen best in Figs. 2 and 3. As shown, this includes a pair of spring clip members 28 adapted for holding the panel 24 to either of the aforesaid conventional visors.

The supporting member 26 is constructed so that it can be attached either to the center post 30 of the windshields or to a top portion 32 of the motor vehicle. The former construction is shown in Fig. 3 where the arm 34 is secured to the center post 30 by means of the screw 36. If desired, the arm 34 can be bent upwardly to be attached to the top portion 32 by a screw or any other similar fastening mechanism. As shown in Fig. 3, the screw 36 extends through the aperture 38 in the support member 26. If desired, the support member 26 can be secured directly to the post 30 by extending the screw 36 through the apertures 40. If desired, it is contemplated to use other supporting means which can be produced economically and which will support the panel 24 in the manner desired.

From the above description, it can be seen that an auxiliary glare shield for automobiles has been provided which is constructed and arranged to permit the operator of the vehicle to selectively mount the auxiliary glare shield in the motor vehicle between the conventional visors 10 and 12 so as to prevent the glare from the headlights of approaching vehicles and the glare from the sun from interfering with the driver's operation of the motor vehicle. As is believed to be readily understood, this permits the driver to operate the vehicle with greater safety and also prevents unnecessary eye strain.

As can be seen, the present auxiliary glare shield does not interfere with the use of the rear view mirror, but prevents unnecessary glare from interfering with the driver's operation of the motor vehicle. It is further believed to be readily apparent that the present auxiliary glare shield can be manufactured at a relatively low cost because of its extreme simplicity and few component parts.

Having thus described my invention, I claim:

1. A transparent visor adapted to be mounted in a motor vehicle behind the rear view mirror and between the conventional visors of said vehicle, comprising an elongated transparent panel of sufficient length to span the space between the said conventional visors, and a supporting member attached to the upper edge of said panel and midway of the ends thereof, said supporting member having a spring clip on one side of said panel for clipping said panel to the back of one of said conventional visors when said sun visor is not in use and said supporting member having an arm on the other side of said panel for securing the latter to a portion of the body of said motor vehicle said panel having a slot extending upwardly from its lower edge for receiving the supporting post of said mirror.

2. A transparent visor adapted to be mounted in a motor vehicle having conventional visors and a rear view mirror mounted between said visors, comprising an elongated transparent panel of sufficient length to span the space between said conventional visors, said panel having a slot extending upwardly from its lower edge for receiving the supporting post of said rear view mirror, and a supporting member having a spring clip on one side of said panel for clipping said panel to the back of one of said conventional visors when said transparent visor is not in use and said supporting member having an arm on the other side of said panel for securing the latter to a portion of the body of said motor vehicle.

3. A transparent visor as claimed in claim 2, wherein said panel is formed from a polarized material.

4. A transparent visor as claimed in claim 2, wherein said panel is formed from a tinted transparent material.

5. An article of manufacture comprising an elongated relatively thin transparent panel having a slot extending inwardly from the midpoint of one of its elongated edges for at least one half its width, and a sheet metal support member attached to the other elongated edge midway of its ends, said support member having a spring clip formed on one side of said panel and a supporting arm on the other side of said panel.

MARY E. BEAUCHAMP.

REFERENCES CITED

The following references are of record in the file of this patent:

UNITED STATES PATENTS

| Number | Name | Date |
| --- | --- | --- |
| 1,492,748 | Reimer | May 6, 1924 |
| 2,033,391 | Muench | Mar. 10, 1936 |
| 2,252,715 | Levy | Aug. 19, 1941 |
| 2,252,716 | Levy | Aug. 19, 1941 |
| 2,351,797 | Young | June 20, 1944 |
| 2,549,395 | Short | Apr. 17, 1951 |